Figure 1:
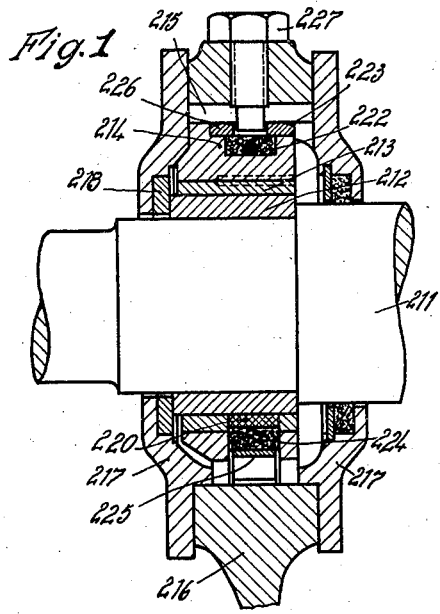

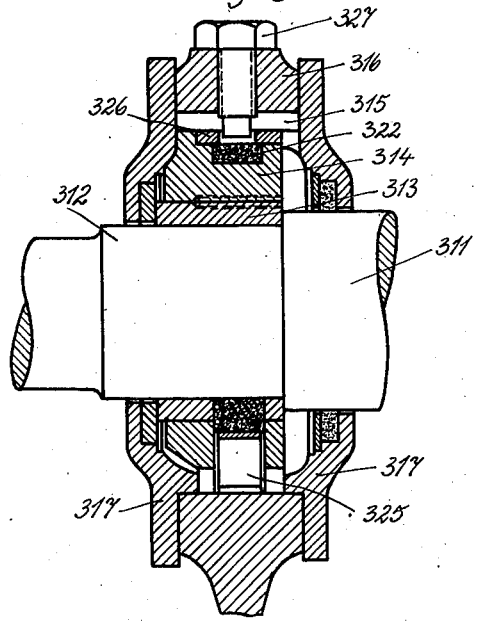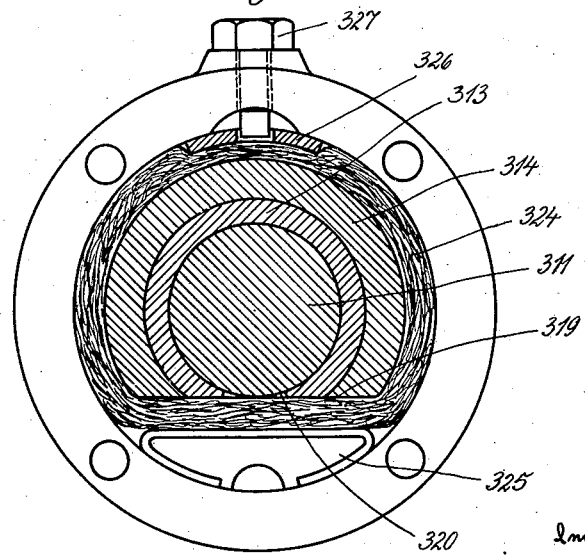

Sept. 17, 1935.    W. PEINEKE ET AL    2,014,584
PLAIN BEARING
Filed Sept. 21, 1931    3 Sheets-Sheet 3

Patented Sept. 17, 1935

2,014,584

UNITED STATES PATENT OFFICE

2,014,584

PLAIN BEARING

Wilhelm Peineke and Karl Reschke, Berlin, and Hans Dietzius, Gatow A/H, Germany, assignors to Siemens-Schuckertwerke Aktiengesellschaft, Berlin-Siemensstadt, Germany, a corporation of Germany Application September 21, 1931, Serial No. 564,062
In Germany March 1, 1930

3 Claims. (Cl. 308—121)

Machines which are to run noiselessly must be provided with plain bearings as a singing noise is practically always unavoidable with anti-friction bearings. Plain bearings have, however, generally a greater axial length than the usual ball bearings calculated for the same bearing pressure. It is consequently not possible just to substitute plain bearings for ball bearings. It has, it is true, been proposed to construct a bearing housing in which ball bearings or plain bearings can be inserted as desired. This bearing housing is, however, so long that the plain bearing with its greater length can be fitted therein. According to the invention, an interchangeability of plain and ball bearings is to be attained while retaining the bearing housing dimensioned for normal ball bearings.

According to the invention the bearing housing mounted in the bearing bracket is provided inside with a running sleeve, which cooperates with a bush put onto the shaft, the sleeve being provided with a tangential recess for the lubricating wick. This running sleeve is of material of great hardness so that no appreciable change in the bearing dimensions occurs during the life of the machine.

By means of the plain bearing constructed according to the present invention, it is possible to fit up ordinary motors having ordinary bearing brackets with ball or plain bearings just as desired, without the slightest alteration being necessary. The interchange is extremely simple and can take place without it being necessary to remove the bearing bracket. An examination of the bearing part and any change of the bearing bush is also considerably simplified as, for this purpose, the whole bearing can be removed. A special advantage is that the axial bearing play can be regulated by the insertion of washers between the flange of the bearing housing and the bearing bracket. A further advantage of the bearing described consists in the fact that when the bearing is assembled, the wick is introduced into a tangential recess so that the shaft can be inserted without holding the lubricating wick separately to keep it from being pinched by the shaft.

Moreover, if a lubricating wick of high saturating capacity is used (mainly consisting of loose strands of wool or cotton), the wick may readily be pulled apart by the revolving shaft and be pulled between the shaft and the bearing sleeve. This is detrimental to the lubrication and is liable to increase friction. If, to prevent such things happening, a wick of different material were used which is not subject to the above-mentioned action, the saturation by the oil would not be so great and breakdowns due to insufficient lubricating would be the result. To prevent this according to the invention, the wick is composed of two parts of different material, one part of compact material in the groove of the running sleeve and laying itself against the revolving shaft, the second part of less compact material, but of high saturation capacity, especially of threads of cotton or wool, which lays itself round the first wick and dips into the oil sump of the bearing. By the high saturation capacity of the second part a copious supply of oil is furnished to the first compact part of the wick which cannot be pulled apart by the shaft so easily. This guarantees reliable lubrication.

Figure 2:
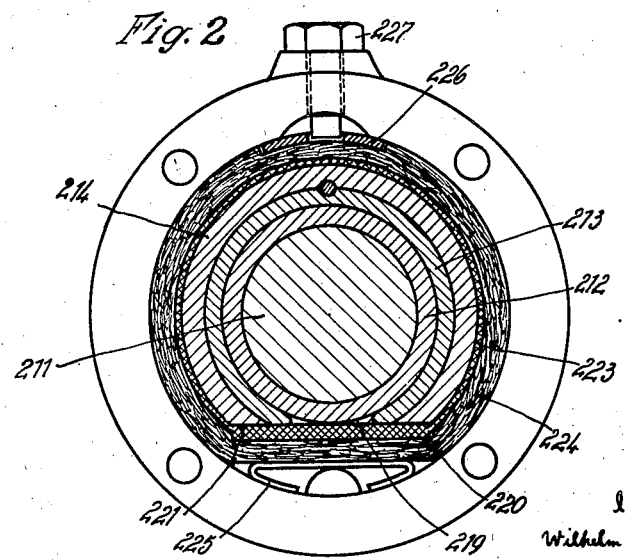
Figure 5:
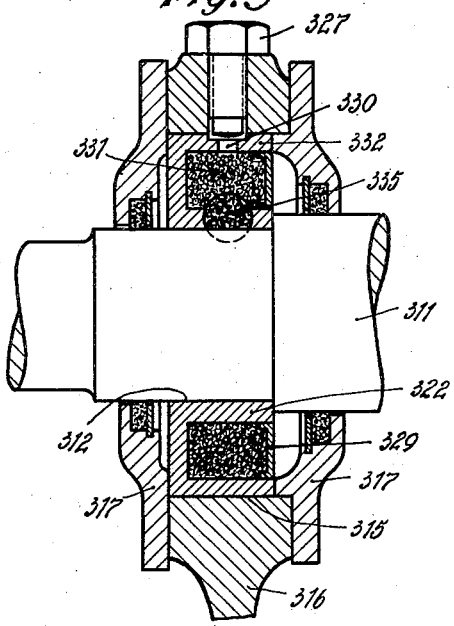
Figure 6:
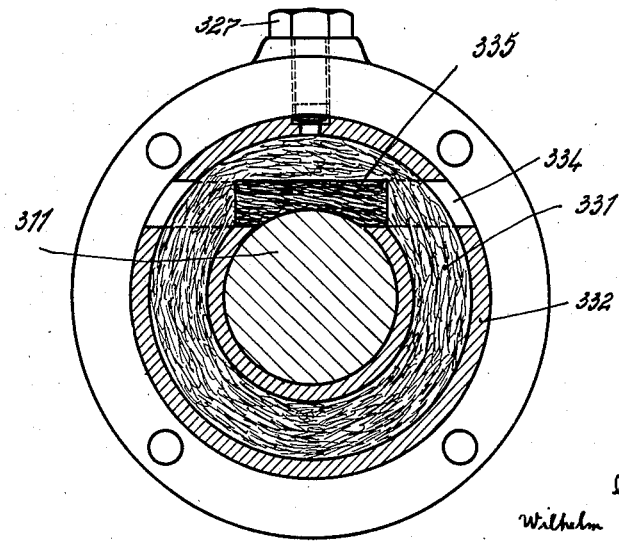

The invention is illustrated in several modifications in the accompanying drawings in which:

Fig. 1 represents a longitudinal section through a convertible bearing according to the invention, Fig. 2 represents a transverse section through it, Figs. 3 and 4 represents a longitudinal and a transverse section respectively through a modification of Fig. 1, and Figs. 5 and 6 represent a longitudinal and a transverse section respectively through a further modification of Fig. 1.

A bearing involving the double wick form is shown in Figs. 1 and 2. On a shaft 211 there is fixed a running ring 212 of hard material such as steel, cast-iron, hard bronze, or the like. This ring rests in a bearing sleeve 213 of hard bronze or similar material. The sleeve is surrounded by and fixed to a bearing shell 214 which is inserted in opening 215 of a housing 216, e. g. of the bearing bracket of an electric motor. Laterally the bearing is closed by the two caps 217 whose flanged rims are bolted (not shown) to housing 216. The ring 212 on the shaft is laid against one shoulder of the shaft 211 and is held from axial movement by a pressure ring 218 in the left cap 217.

Bearing shell 214 is provided with a circumferential slot 222, which at the lower bearing portion is deepened into a straight slot 221 running tangentially and passing through sleeve 213 to form an oblong opening in the latter (see Fig. 2). The wick 220 of some compact material (e. g. lamp wick) located in slot 221 touches the running ring 212 of the shaft. This wick is held in position by a length of cord 223 which is accommodated in slot 222 of shell 214 and is attached to the two ends of wick 220. Another wick 224 of loose threads of wool or cotton is placed against wick 220. Wick 224 is pressed against running ring 212 together with wick 220 by means of plate spring 225 pressing against the inner wall of housing 216. Wick 224 is held in place by a strip of sheet metal 226 which is locked in position by a screw 227.

The lower part of the housing 216 containing plate spring 225 also serves as an oil container so that the lubricating point of the shaft running ring 212 is in close proximity of the oil sump and therefore can still provide correct and reliable lubrication when the upper parts of wicks 220 and 224 are not sufficiently saturated with oil. In view of the high saturating capacity of wick 224, the whole oil is conducted to the lower part of lamp wick 220. Its own low saturating capacity cannot be detrimental to the oil passage because all it has to do is to carry the oil from the lower part of thread wick 224 to the point of contact with ring 212.

In order to simplify the construction of the bearing, the running ring 212 on the shaft can be dispensed with. In that case the shaft should be hardened at the running surface which could, for instance, be effected by heating the bearing neck of the shaft at the point to be treated by means of a blowpipe and then cooling it. This method of hardening has become very popular lately for hardening crank shafts of internal combustion engines etc. and has the advantage that the only part of the shaft to be hardened is really the part subject to the pressure. If the running ring on the shaft is dispensed with, the diameter of the bearing can be very much reduced, which to some extent also reduces its cost.

Such a bearing is shown in Figs. 3 and 4. The hardened bearing neck 312 of shaft 311 rests in a bearing sleeve 313 of appropriate metal, e. g., hard bronze. Sleeve 313 is surrounded by and fixed to a bearing shell 314 inserted in bore 315 of a housing 316 (of an electric motor, for instance). Laterally the bearing is closed by the two caps 317 whose rims, made as flanges, are assumed to be bolted to carrier 316. Ring 314 is provided with a circumferential groove 322 for accommodating wick 324. At one point groove 322 is deepened into a tangential groove 319 passing through sleeve 313 and through which wick 324 can be applied to running surface 312 of shaft 311. Wick 324 is pushed into groove 319 by a plate spring 325 and is thus permanently pressed against the shaft and is given greater density, which prevents its being pulled apart as mentioned hereinbefore. Wick 324 is held in position by a strip of sheet metal 326. This strip is locked by screw 327. The wick used is a thread wick, but of course it is also possible to use two different wicks as shown in Figs. 1 and 2.

In order to simplify interchanging ball and plain bearings, it is advisable to construct the part of the plain bearing containing the bearing sleeve and the wick in such a manner that it can be pushed onto the shaft in place of the rings of a ball bearing and can fill the housing to the same extent as the ball bearing. This can be done with the aid of the construction shown in Figs. 5 and 6. Here shaft 311 whose running surface 312 is assumed to be hardened as described with reference to Fig. 3 is located in a bearing ring of a laterally open U-shaped cross-section, which contains in its interior wick 331.

At the inner periphery of ring 322 is provided a tangential bore 334 accommodating a wick 335 of compact material. The wick can lay itself against the shaft through the opening 334. Ring 332 fills the bore 315 of bracket 316 and is held circumferentially in position by screw 327 which simultaneously serves as a filling screw for introducing new oil, i. e., this screw closes the filling opening 330 of ring 322. Again the bearing is closed laterally by the two lids 317. The ring 322 is made of some suitable bearing metal because its inner periphery serves directly as a running surface. It can be made in one part by some suitable method. At its open side it is closed by a sheet metal plate 329. Thus it can easily be pushed into the bearing housing in place of a ball bearing.

Ring 322 accommodating the wick can also be made of sheet iron or other suitable sheet material in which case a special running sleeve of metal suitable for bearings must be provided the same as shown at 313 in Fig. 3. This type of ring is to be considered the best for large bearings.

We claim

1. In a bearing, convertible from a ball bearing into a plain bearing, in combination, a shaft, a bearing housing having a bore adapted to receive a plain bearing or a similar size ball bearing, a plain bearing box removably disposed in said bore and having the width and diameter of the outer race of a ball bearing, a bushing of bearing metal within said bearing box, said bearing box having an annular groove, said bearing box and bushing having a common tangential groove extending to the surface of the shaft, a closely woven wick housed in the tangential groove of said bushing and being in contact with said shaft, and a highly absorbent wick of loose fibres surrounding said closely woven wick and being located in the groove portion of said bearing box.

2. In a bearing, convertible from a ball bearing into a plain bearing, in combination, a shaft, a bearing housing adapted to receive a plain bearing or a similar size ball bearing, a U-shaped ring open at one end and having the width and diameter of the outer race of the ball bearing, a tangential recess in said ring extending to the shaft, a closely woven wick disposed in said tangential recess and having an intermediate portion in tangential contact with the shaft, a wick of loose fibres surrounding said closely woven wick and being housed in said U-shaped ring, an annular disc closing the open end of the U-shaped ring to retain the wick, and cover plates attached to said housing for closing the bearing on both sides.

3. In a bearing, convertible from a ball bearing into a plain bearing, in combination a shaft, a bearing housing having a bore adapted to receive a plain bearing or a similar size ball bearing, a plain bearing box removably disposed in said bore and having the width and diameter of the outer race of said ball bearing, said bearing box having a suitable annular recess, and a tangential recess in said annular recess, extending to the shaft, a closely woven wick in said tangential recess and a highly absorbent wick surrounding said closely woven wick and being located in said annular recess for supplying lubricant through the closely woven wick to said shaft.

WILHELM PEINEKE.
KARL RESCHKE.
HANS DIETZIUS.